Dec. 28, 1965   D. ARCABASSO   3,225,735

AGITATOR FOR BREADING MEATS

Filed April 30, 1962

INVENTOR.
DOMENICO ARCABASSO
BY John W. Smith
AGENT.

3,225,735
AGITATOR FOR BREADING MEATS
Domenico Arcabasso, St. Louis, Mo.
(460 Sky Lark Drive, Florissant, Mo.)
Filed Apr. 30, 1962, Ser. No. 191,196
2 Claims. (Cl. 118—19)

This invention relates to an agitator for breading meats, such as chops, chicken, fish and shrimp.

The object of the invention is to provide an agitator which will enable the formation of a uniform coating or batter carrying bread crumbs on meats, such as pork, lamb and veal chops, etc.

Another object of the present invention is to provide an agitator for the application of a coating of batter carrying bread crumbs to meats, such as chops, which includes a pan for containing the batter and an agitator for containing the bread crumbs and receiving the chops in close juxtaposition to the pan.

A further object of the present invention is to provide an agitator for breading meats, which provides for the breading operation to be carried out effectively and in a neat and orderly manner.

Still other objects, advantages and improvements will become apparent from the following specification, taken in connection with the accompanying drawing, in which.

Figure 1:
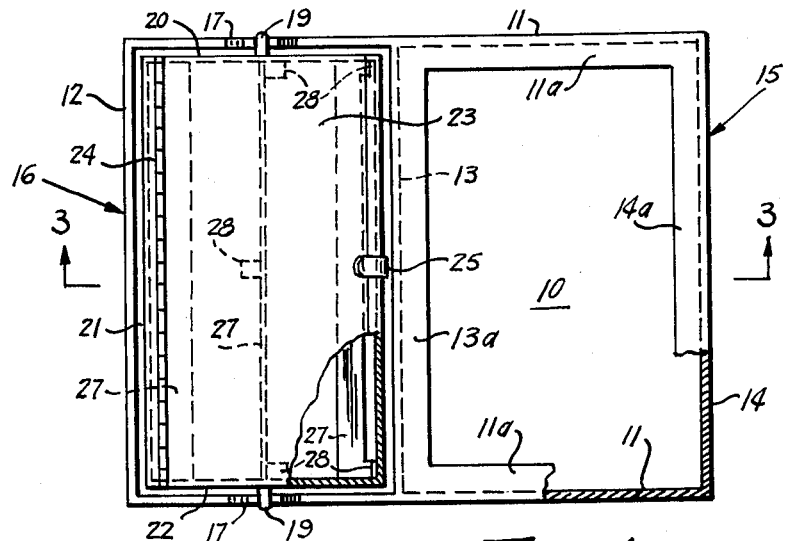
FIGURE 1 is a top plan view of the agitator according to the present invention.
Figure 2:
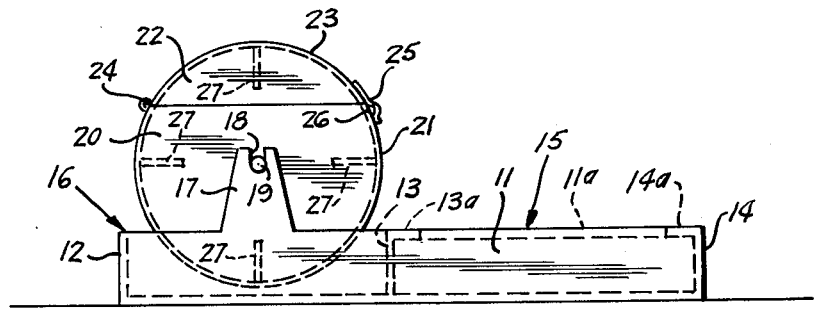
FIGURE 2 is a side elevation view of the agitator.
Figure 3:
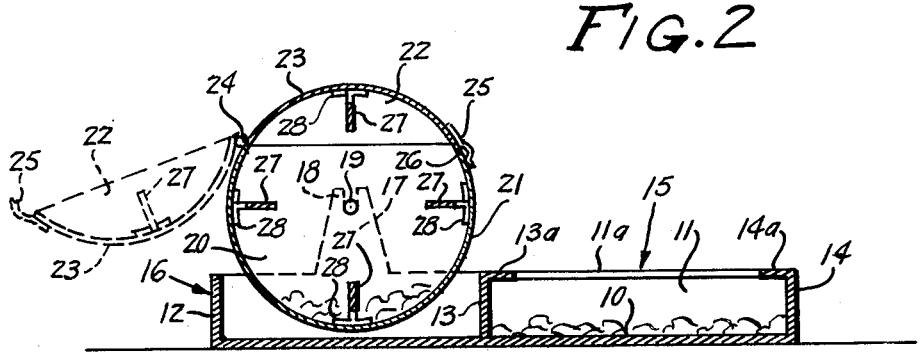
FIGURE 3 is a vertical sectional view, taken on the section line 3—3 of FIGURE 1 and looking in the direction of the arrows.

Referring now to the drawings in detail and to FIGURE 3 in particular, the agitator according to the present invention is here shown as comprised in part by a base having a bottom 10, which latter is preferably of generally rectangular shape. The base has side walls 11—11, a rear wall 12, a transversely positioned central partition 13, and a front end wall 14. Inwardly extending flanges 11a—11a, 13a and 14a are formed on the side walls 11—11, the central partition 13 and the front end wall 14, respectively. At the front of the base there is the batter pan, which is generally designated by the reference numeral 15, and which is comprised by the bottom 10, side walls 11—11, central partition 13, and the front end wall 14; at the rear of the base there is the trough, which is generally designated by the reference numeral 16, and above which the agitator cylinder, to be later described, is rotatably mounted. The trough 16 is comprised by the bottom 10, the side walls 11—11, the rear wall 12 and the central partition 13.

Along the transverse center line of the trough 14 there are positioned on the side walls 11—11 uprights 17—17, respectively, which may be integral with the side walls or formed as separate members and secured to the side walls. At their tops these uprights are formed with bearings 18—18. As shown, these bearings are vertically positioned open top and rounded bottom slots, but it is contemplated that the bushing type of bearing may as well be used.

The agitator cylinder is comprised in part by end walls 20—20 and a cylindrical side wall 21. At the centers of the end walls 20—20 there are mounted trunnions 19—19, which are rotatably received in the bearings 18—18 in the uprights 17—17. The end walls 20—20 of the cylinder are cut away along a chord and the side wall 21 is likewise cut away to form a filling and discharge opening. This opening is closed by a cover, which is comprised by end walls 22—22, the latter being aligned in vertical planes with the end walls 20—20, respectively, of the cylinder, and a side wall 23, which is a curvilinear continuation of the side wall 21 of the cylinder. At its bottom and along one side, the curved side wall 23 of the cover is secured to the side wall 21 of the cylinder by a pair of hinges 24. On the other side and at its midsection the side wall 23 of the cover is provided with a catch member 25; a complementary catch member 26 is mounted on the side wall 21 of the cylinder.

On the inner face of the side wall 21 of the cylinder there are mounted longitudinally extending and radially positioned agitator or bumper plates 27. Four (4) of these are shown but a greater or a lesser number could as well be used. Three (3) are spaced ninety degrees (90°) apart around the inner surface of the side wall 21 of the cylinder, and a fourth on the inner surface of the side wall 23 of the cover, spaced ninety degrees (90°) from the two on the inner face of the side wall of the cylinder. For securing these agitator plates to the inner face of the side wall 21 of the cylinder and the inner face of the side wall 23 of the cover, and reinforcing same in their radially inwardly extending positions, base plates 28—28 are provided on the opposite sides of same. Alternatively the agitator plates 27 may be of sheet metal, folded double and the base plates 28—28 integral oppositely extending flanges on same.

In use, the batter is placed in the pan 15 and then desired bread crumbs in the cylinder 21. The pork, lamb or veal chops are then dipped in the batter and dropped into the cylinder 21. The cover 23 is closed and latched in position by the catch member 25. Any particles dropping off the chops, or crumbs escaping through the top of the cylinder 21 will fall into the trough 16. Then by a turn of the wrist the cylinder 21 is rotated and the chops therein are coated with the bread crumbs. The cylinder 21 is turned readily and with ease. The uniformly spaced agitator plates 27 knock off the excess bread crumbs and the chops are evenly breaded for frying.

Having now fully described by invention, what I claim as new and useful and desired to secure by Letters Patent of the United States is:

1. An agitator for breading meats comprised by a base having a bottom, side walls, and a transversely extending partition forming with one end wall and the side walls a batter pan, and forming with the other end wall and the side walls a trough, a rotary cylindrical element having circular end walls and a cylindrical side wall of slightly less diameter than the length of the trough, and said end walls being cut away along sectors having coplanar chords and said cylindrical side wall being cut away along an arcuate length subtended by said chords to form a door opening, and a door on said cylindrical element for closing the door opening having end walls of sector shape complementing the circular end walls of the cylindrical element, and an arcuate side wall complementing the side wall of the cylindrical element, bearing means rotatably supporting the cylindrical element transversely of and partially within the trough and providing for the partial rotation of the cylindrical element to a position where one side of the door opening is in closely spaced relationship with the top of the partition, pivotal means between the cylindrical element and the door on the side wall of the cylindrical element disposed away from the partition, and complementary catch means on the cylindrical element and the door on the side wall of the cylindrical element adjacent the partition, and longitudinally extending and arcuately spaced agitator plates on the inner surfaces of the side walls of the cylindrical element and the door.

2. An agitator for breading meats comprised by a base having a bottom, side walls, and a transversely extending partition forming with one end wall and the side walls a batter pan, and forming with the other end wall and the side walls a trough, uprights on the side walls of the base at the mid-length of the trough forming aligned bearings at their tops, a rotary cylindrical element journalled in said bearings transversely of and partially within the trough, said rotary cylindrical element having circular end walls and a cylindrical side wall of slightly less diameter than the length of the trough and said end walls being cut away along sectors having co-planar chords and said cylindrical side wall being cut away along an arcuate length subtended by said chords to form a door opening, said door opening being alignable along one side in closely spaced relationship with the top of said partition in a partially rotated position of said rotary cylindrical element, and a door forming part of the cylindrical element for closing the door opening having end walls of sector shape complementing said cut end wall portions, and an arcuate side wall complementing the cut side wall of portion the cylindrical element, pivotal means between the cylindrical element and the door on the side wall of the cylindrical element disposed away from the partition, and complementary catch means on the cylindrical element and the door on the side wall of the cylindrical element adjacent the partition, and longitudinally extending and arcuately spaced agitator plates on the inner surfaces of the side walls of the cylindrical element and the door.

References Cited by the Examiner
UNITED STATES PATENTS

| | | | |
|---|---|---|---|
| 125,225 | 4/1872 | Smith | 51—164 |
| 230,857 | 8/1880 | Briggs | 118—418 |
| 407,502 | 7/1889 | Young | 118—418 |
| 475,840 | 5/1892 | Woods | 118—19 |
| 929,804 | 8/1909 | Thompson | 51—164 |
| 1,880,822 | 10/1932 | Cook et al. | 118—418 |
| 1,983,401 | 12/1934 | Robinson | 51—164 |
| 2,351,453 | 6/1944 | Pearl | 51—164 |
| 2,616,391 | 11/1952 | Russell | 118—19 |
| 3,081,070 | 3/1963 | Welsch | 118—19 |

CHARLES A. WILLMUTH, *Primary Examiner.*

RICHARD D. NEVIUS, *Examiner.*